United States Patent [19]

Sano et al.

[11] 4,107,049

[45] Aug. 15, 1978

[54] PROCESS FOR PRODUCING SEMIPERMEABLE MEMBRANES

[75] Inventors: Takezo Sano, Takatsuki; Takatoshi Shimomura, Toyonaka; Masao Sasaki, Osaka; Ichiki Murase, Ibaragi, all of Japan

[73] Assignee: Sumitomo Chemical Company, Limited, Osaka, Japan

[21] Appl. No.: 736,071

[22] Filed: Oct. 27, 1976

[30] Foreign Application Priority Data

Oct. 30, 1975 [JP] Japan .................................. 50-131253

[51] Int. Cl.² .................... B29D 27/04; B01D 31/00; B01D 39/00
[52] U.S. Cl. ................................. 210/490; 210/500 M; 264/22; 264/41
[58] Field of Search ............................. 264/41, 49, 22; 210/490, 500 M

[56] References Cited

U.S. PATENT DOCUMENTS

| | | | |
|---|---|---|---|
| 3,657,113 | 4/1972 | Stancell et al. | 210/490 X |
| 3,846,521 | 11/1974 | Osterholtz | 264/41 X |
| 3,847,652 | 11/1974 | Fletcher et al. | 264/22 X |
| 3,950,257 | 4/1976 | Ishii et al. | 210/500 M |
| 3,992,495 | 11/1976 | Sano et al. | 264/49 X |
| 4,046,843 | 9/1977 | Sano et al. | 264/22 |

OTHER PUBLICATIONS

The Condensed Chemical Dictionary, Eighth Edition, revised by Gessner G. Hawley, New York, Van Nostrand Reinhold, c1971, p. 15.

*Primary Examiner*—Philip Anderson
*Attorney, Agent, or Firm*—Stevens, Davis, Miller & Mosher

[57] ABSTRACT

A method for the preparation of semipermeable membranes is disclosed which comprises exposing porous shaped articles of polyacrylonitrile or copolymers containing acrylonitrile in an amount of more than 40% by mole to a plasma consisting essentially of a gaseous organic compound or the mixture of said gaseous organic compound and an inert gas at room temperature under a pressure of 0.01 to 10 Torr.

18 Claims, 1 Drawing Figure

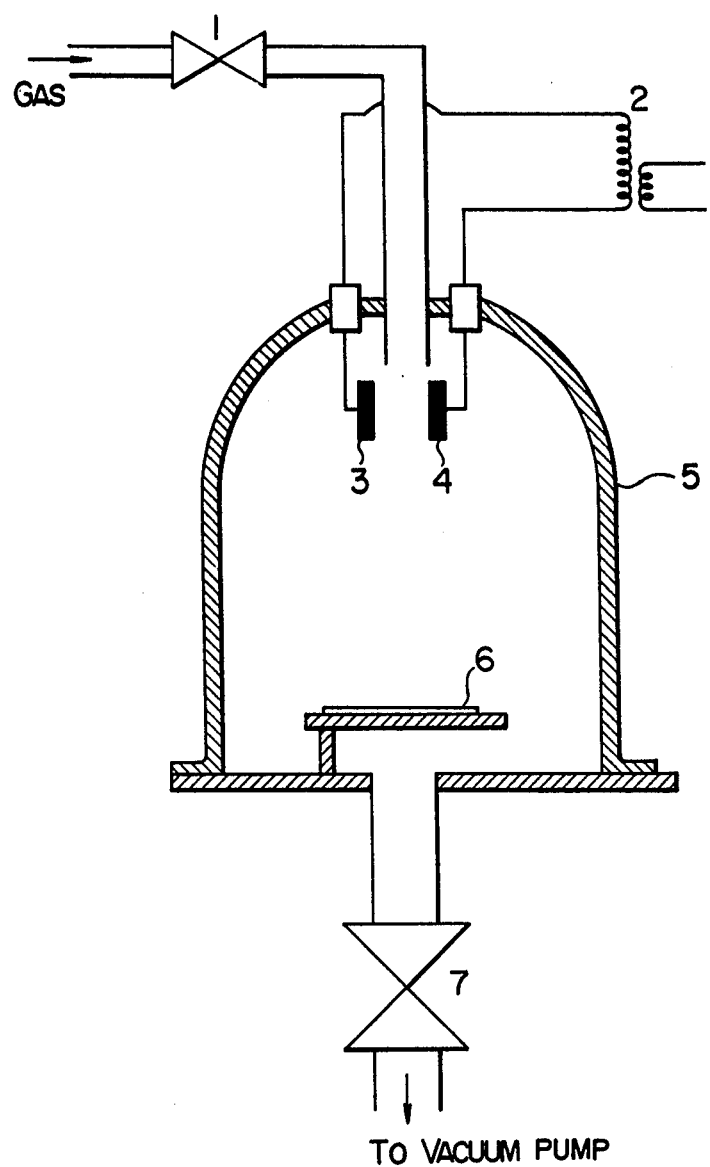

PROCESS FOR PRODUCING SEMIPERMEABLE MEMBRANES

The present invention relates to a method for the preparation of novel semipermeable membranes. More particularly, it relates to a method for the preparation of semipermeable membranes having not only an extremely high strength but also a high water permeability and high selectivity, which comprises exposing porous membranes made of polyacrylonitrile type copolymers to a plasma comprising a gaseous organic compound or the mixture of said gaseous organic compound and an inert gas.

Semipermeable membranes now in industrial production are cellulose acetate membranes produced according to the method of Loeb and Sourirajan (U.S. Pat. Nos. 3,133,132 and 3,133,137) or by similar methods. Although these membranes are very highly permeable to water but not to sodium chloride, they deteriorate in performance owing to the inherent susceptibility of cellulose acetate to hydrolysis. As a result, the ability to remove solutes, including sodium chloride becomes poor with the lapse of time, and the life of cellulose acetate membranes is limited.

Further, Loeb's method for the preparation of an asymmetric membrane having a skin structure requires a high-level technique and severe operating conditions. Comsequently, this method is only successful in a few cases of synthetic high-polymers besides cellulose acetate. This is due to the fact that it is difficult to properly select the casting solvent, the additives, the composition and temperature of the casting solution, the atmosphere wherein evaporation of the solvent occurs, and the temperature of the atmosphere. Therefore, this method may not be said to be widely applicable.

Further, in recent years, various attempts have been made to prepare a polyacrylonitrile type semipermeable membrane which is superior to cellulose acetate in chemical, mechanical, and thermal properties, and in water permeability (for example Japanese Patent Publication (unexamined) Nos. 6257/1972 and 43,878/1974). These attempts were intended to form a skin layer and a supporting layer at the same time by the above described casting process. However, the resulting membranes did not have stable performance, because selection of proper casting conditions is very difficult. In the case of polyacrylonitrile type polymers formation of the skin layer is difficult to achieve by the casting process.

Also recent years, on the other hand, attempts have been made to prepare a composite membrane by using instead of these casting processes, a plasma polymerization process by electric discharge (for example, Japanese Patent Publication (unexamined) No. 88,982/1973). This composite membrane refers to membranes comprising an inactive support having very fine pores (porous filter paper made of cellulose) and a ultrathin membrane deposited thereon from the plasma of a gaseous unsaturated organic compound.

This method has however various drawbacks. For example, it is difficult to obtain stable semipermeable membranes with a good reproducibility, and the maintenance of the system is also difficult owing to the staining of the system by polymerization and decomposition of the introduced gas. Further, when inactive base materials are used, there is not obtained a sufficient adhesion between the base materials and ultra-thin membranes deposited thereon from the plasma of a monomer. In particular, the semipermeable membranes thus obtained have the serious drawback that performances thereof are reduced on a long-term operation.

The inventors already proposed various novel methods for the preparation of semipermeable membranes, for example, a method comprising coating porous supports with water-soluble, high-polymer and exposing them to a plasma, a method comprising directly exposing porous supports made of polyacrylonitrile polymers to a plasma, and the like.

Further, the inventors extensively studied the atmosphere of the plasma and materials for the supports in order to prepare semipermeable membranes having good performance. As a result, the following very important facts were found: when porous membranes made of polyacrylonitrile polymers are used as a support and exposed to a plasma comprising a gaseous organic compound, semipermeable membranes that are chemically and mechanically very stable are obtained in a short period of treating time. And further, surprisingly, the membranes thus obtained have performance much superior to the performance of acetate cellulose membranes and commercially available synthetic high-polymer membranes.

When porous membranes made of polyacrylonitrile copolymers are exposed to a plasma comprising an inert gas alone, a dense crosslinked layer as thin as less than 1 $\mu$ in thickness is formed on the surface of the membranes. In the present invention, when the porous membranes are exposed to a plasma comprising a gaseous organic compound as in the present application, there may occur crosslinking of the membrane surface itself, and at the same time a remarkable graft reaction with the crosslinked surface.

An object of the present invention is to provide a novel method for the preparation of semipermeable membranes having a high strength, high chemical and mechanical stability, and extremely high water permeability and selective permeability, which comprises exposing porous membranes made of polyacrylonitrile copolymers to a plasma comprising a gaseous organic compound, thereby modifying the membrane surface.

According to the present invention, it is possible to prepare a polyacrylonitrile type semipermeable membrane which is free from the defects of the conventional cellulose acetate membrane, namely susceptibility to hydrolysis and deterioration by the action of bacteria, and is applicable to separation and concentration of substances.

FIG. 1 is a schematic diagram of a plasma irradiating apparatus for use in the method of the present invention. In the diagram, 1 and 7 are cocks, 2 is a neon transformer, 3 and 4 are electrodes, 5 is a vessel, and 6 is a sample.

Polyacrylonitrile used in the present invention can be prepared by well-known methods. As the monomers to be copolymerized with acrylonitrile, there may be exemplified the well-known compounds copolymerizable with acrylonitrile, for example, a nonionic monomer (e.g. acrylamide, diacetone acrylamide, N-vinyl-2-pyrrolidone, hydroxyethyl methacrylate, methyl acrylate, ethyl acrylate, butyl acrylate, methyl methacrylate, ethyl methacrylate, vinyl acetate). Further, acrylonitrile is easily polymerizable with, for example an ionic monomer (e.g. acrylic acid, ethylene sulfonic acid, methacrylic acid, methallyl sulfonic acid, sulfopropyl methacrylate, vinylbenzene sulfonic acid, metal salts thereof), tertiary amines (e.g. 2-vinylpyridine, 4-vinylpyridine, dimethylaminoethyl methacrylate) and quaternary amine salts resulting from alkylation of the tertiary amines. The acrylonitrile copolymers used herein are copolymers of acrylonitrile and one or more of the aforesaid monomers.

The amounts of monomers is can be varied, but when the acrylonitrile content of the copolymers is reduced to less than 40% by mole, the membrane formed has an extremely poor mechanical property. Consequently, particularly preferred copolymers are those containing 70 to 95% by mole of acrylonitrile. The polyacrylonitrile and acrylonitrile copolymers used herein have a molecular weight of 5,000 to 5,000,000.

The porous shaped articles to be subjected to exposure to plasma have a porosity of 10 to 90%. The porous shaped articles are not particularly limited in the method for the preparation thereof, but particularly preferred ones are porous membranes prepared by the conventional casting process comprising solvent evaporation and gelation. The porous articles may be used in various forms. Specifically, the articles may be in the form of a sheet or a hollow fiber in addition to the membrane form, or may form a composite with other porous supports. The articles are used practically as a module having a suitable form after being exposed to a plasma.

The usual casting process for the preparation of a porous membrane of polyacrylonitrile type polymers is as follows. First, polyacrylonitrile or acrylonitrile copolymers are dissolved in a solvent so that the concentration thereof is 5 to 30% by weight. The solvent used is an aqueous solution containing inorganic salts or an organic polar solvent such as dimethylacetamide, dimethylformamide or dimethyl sulfoxide.

The polymer solution obtained is cast on a substrate, for example, a glass plate with a doctor knife. The thickness of the cast solution is related to the thickness of the semipermeable membrane. Consequently, the thickness of the solution on the substrate is generally controlled so as to form a semipermeable membrane having a thickness of about 250 $\mu$. The coated substrate is dipped in a non-solvent immediately after the casting or after the solvent of the solution is evaporated for some time.

In general, the period of time during which the solvent is evaporated is preferably 0 to 60 minutes and the evaporation is preferably carried out at a temperature between 0° C and the boiling point of the solvent. Thereafter, the coated substrate, from which the solvent may partially be evaporated or may not be evaporated, is dipped in a non-solvent. As the non-solvent, there may be used water or a mixture of water and an organic solvent. The organic solvent used herein is a water-soluble one and preferably the same solvent that is used for the preparation of said polymer solution.

In the preparation of the porous membrane, various operating conditions, for example, the polymer concentration, the casting temperature, the evaporation time and gelation temperature, have, of course, an influence on the performance of the final product, namely, the plasma-exposed membrane, but the conditions are not critical. The porous membrane thus obtained can be applied to exposure to plasma, if it has a water permeability of 1 to 1,000 gfd (under a pressure of 10 kg/cm$^2$) and a bubble point of more than 1 kg/cm$^2$ in the wet state of the membrane, in other words, if the membrane is free from defects. The present invention is rather intended to regulate the performance of the final product by controlling the plasma exposure conditions. In the exposure to plasma, a dried porous membrane is used in principle.

The plasma referred to herein means a plasma generated by glow discharge, high-frequency discharge, corona discharge or the like. Among them, the glow discharge is particularly preferred. For example, the plasma by glow discharge is generated by introducing an organic compound in a gaseous form or the gaseous mixture of the organic compound and an inert gas (e.g. helium, argon, nitrogen, oxygen, carbon monooxide, carbon dioxide, ammonia, water) into a vacuum vessel 5 as shown in FIG. 1 so that the pressure in the vessel is 0.01 to 10 Torr, and applying an alternating current or direct current voltage of 0.5 to 50 KV between electrodes 3 and 4 by means of a neon transformer 2. In this case, it is preferred to use the inert gas of 0 to 100 moles based on 1 mole of the gaseous organic compound.

As the organic compounds used in the present invention, any compound may be used if it takes a gaseous form under a pressure of 0.01 to 10 Torr and has an ability, in the gaseous form, to form non-volatile film in the atmosphere of plasma.

Among them, those which are suitable for the practice of the present invention include unsaturated organic compounds having a multiple bond between carbon atoms, for example, polymerizable compounds having no substituents (e.g. ethylene, acetylene, allene) and polymerizable compounds having substituent (e.g. acrylonitrile, acrylic acid, 4- (or 2-)vinylpyridine, allylamine, vinyl acetate, allyl alcohol, glycidyl methacrylate, sulfopropyl methacrylate, vinyl alkyl ethers, acrylamides); aromatic compounds (e.g. pyridine, 4-ethylpyridine, 2,6-dimethylpyridine); saturated organic compounds having a hetero atom such as nitrogen or oxygen, for example linear compounds (e.g. dimethylformamide, ethers) and cyclic compounds (e.g. ethylene oxide, dioxane, N-methyl pyrrolidone, ethylene imine).

Among these compounds, polymerizable organic compounds having a double bond between carbon atoms and the saturated organic compounds having a hetero atom are preferred when membranes having selectivity are desired. Particularly, the former polymerizable organic compounds are more preferred because they produce membranes having excellent strength in a short period of plasma-treatment.

The plasma thus generated penetrates into substances to such an extremely low extent that it is very useful for modifying polyacrylonitrile type porous membrane at the surface alone thereof, thereby allowing the membrane to be impermeable to a solute.

The separation property of the semipermeable membranes of the present invention is determined by controlling various factors, among which the exposure time and exposure dose are important. By varying these two factors, it is possible to control the degree of modification at the membrane surface, and thereby obtain a membrane having a high selectivity and the desired separation properties. Usually, the exposure time is 1 to 60 minutes, and the exposure dose is 5 to 500 watt (1 to 5 KV, 5 to 100 mA). These exposure conditions are not general, but dependent upon the water permeability of the polyacrylonitrile type porous membrane in a wet state, and the crosslinkability of the polyacrylonitrile type porous membrane.

As described above, the method of the present invention is characterized by modifying polyacrylonitrile type porous membrane only in the vicinity of the surface thereof by making use of the low degree of the penetration of the plasma into substances, thereby producing a very dense layer at the surface. By this novel technique, it becomes easy to produce a modified dense surface layer having a thickness of less than 1 μ. Consequently, this method is completely free from the difficulty of skin layer-formation which is encountered in the casting process.

The semipermeable membrane of the present invention has a thickness of 20 to 500 μ. By electron microscopic observation, it is found that the membrane has the following characteristic heterogeneous structure: pores of 100 to 1,000 A in size are present in the layer close to the modified dense surface layer, and the size of the pores increases gradually to 1 to 100 μ towards the back surface of the membrane.

On the other hand, one of the features of the present semipermeable membrane is that the membrane is much superior to the conventional cellulose acetate membranes in chemical, mechanical and thermal properties and in the ability to separate substances when used in reverse osmosis and the like.

That is, the semipermeable membranes obtained by the method of the present invention have a high mechanical strength, show no reduction of performance even on a long-term operation, and have a high stability. Further, they are practically usable without problems over a wide pH range of 1 to 12 and within a high temperature range, for example, even at the highest temperature of 80° C.

Further, by the use of the semipermeable membranes of the present invention, selective removal of various inorganic salts including sodium chloride is possible, and particularly even organic substances can be removed with a high rate of rejection. For example, the organic substances difficultly removable with cellulose acetate membranes, for example, alcohols (e.g. phenol, benzylalcohol, ethanol), organic acids (e.g. benzoic acid, acetic acid), amines (e.g. aniline, pyridine) and other various organic compounds (e.g. dimethylformamide, dioxane) can be removed with a rate of 75 to 95%.

Consequently, the plasma-exposed polyacrylonitrile type semipermeable membrane of the present invention is widely used for separating or concentrating substances by reverse osmosis, ultrafiltration or the like. More specifically, it is used for the preparation of fresh water from sea water, waste water treatment, concentration of fruit juices and the like. Further, the present semipermeable membrane is insoluble in many organic solvents, so that it is widely applicable to the separation of non-aqueous fluids.

The present invention will be illustrated more specifically with reference to the following examples, which are not, however, intended to limit the invention thereto.

The solute rejection is defined by the following equation:

$$\text{Solute rejection (\%)} = \left(1 - \frac{\text{the concentration of solute in permeated solution}}{\text{the concentration of solute in feed solution}}\right) \times 100$$

EXAMPLE 1

A copolymer comprising 89% by mole of acrylonitrile and 11% by mole of ethyl acrylate was prepared by the well-known method. Twenty parts of the copolymer were dissolved in a mixed solvent of 70 parts of dimethylformamide and 10 parts of formamide. The resulting solution was cast on a glass plate kept at 40° C so that the thickness of the solution became 250 μ. After 1 minute's evaporation, the glass plate was immersed in water at 16° to 17° C to carry out gelation of the solution.

After 2 hours, the resulting membrane was removed from the glass plate and was tested, as is, for water permeability under a pressure of 10 kg/cm$^2$. As the results, the water flux was 87 gallons/feet$^2$ day (gfd).

Next, the wet membrane was dried overnight at room temperature. The dry membrane was placed in a vacuum vessel shown in FIG. 1 and a pressure of 0.2 Torr of gaseous 4-vinylpyridine was applied in the vessel by controlling cocks 1 and 7. Thereafter, an alternating current voltage of 3.0 kV was applied between electrodes 3 and 4 by means of a neon transformer 2 and the membrane was exposed to the plasma for 10 minutes under such conditions.

The exposed membrane was mounted on a continuous reverse osmosis apparatus (effective area of membrane: 13 cm$^2$) usually used in a laboratory and tested for saline water permeability (sodium chloride concentration: 0.55%).

Experimental conditions:
Pressure; 50 kg/cm$^2$
Temperature of saline water; 25° C
Feed rate of saline water; 270 ml/min
Experimental results (performance of semipermeable membrane):
Water flux; 10.7 gfd
Salt rejection; 98.7%

The unexposed, dry membrane was likewise tested. The water flux was 6.4 gfd, and the membranes showed no ability to remove sodium chloride.

EXAMPLE 2

A membrane of polyacrylonitrile copolymer prepared under the same conditions as in Example 1 was placed in the vacuum vessel as shown in FIG. 1. The pressure of the mixed gas of allylamine gas and helium gas (ratio of gas pressures, 3 : 2) in the vessel was kept at 0.1 to 0.2 Torr by controlling cocks 1 and 7.

Thereafter, an alternating current voltage of 3.0 kV was applied between electrodes 3 and 4 by means of neon transformer 2 and the membrane was exposed to the plasma for 12 minutes. The exposed membrane was mounted on a continuous desalting apparatus and tested for saline water permeability under the same test conditions as in Example 1 : membrane area 13 cm$^2$, pressure 50 kg/cm$^2$, sodium chloride concentration 0.55%, saline water temperature 25° C and feed rate of saline water 270 ml/min.

Test results:

| Test results: | After 20 hours | After 1200 hours |
|---|---|---|
| Water flux | 11.0 gfd. | 11.1 gfd. |
| Salt rejection | 99.6% | 99.4% |

It became apparent from the test results that the membrane maintains excellent performances and a high stability even after such a long-term operation. The semipermeable membrane was dipped in dimethylformamide, a good solvent for the support of the membrane, to remove the soluble portion of the membrane. The washing with dimethylformamide was repeated and the insoluble portion alone was obtained, in the form of thin film, from the membrane.

The film thickness of the insoluble portion was determined according to the weight method. The test value was 0.56 μ.

EXAMPLE 3

Polyacrylonitrile having a logarithmic viscosity number of 2.0 (0.5% dimethylformamide, 25° C) was prepared by the well-known method. Thereafter, a casting solution comprising 15 parts of the polyacrylonitrile and 85 parts of dimethylformamide was prepared. The resulting solution was cast on a glass plate kept at 40° C by means of an applicator having a clearance of 250 μ. After 1 minute's evaporation, the glass plate was immersed in water at 16° C to carry out gelation of the solution.

After 2 hours, the resulting membrane was removed from the glass plate and was tested, as is, for water permeability under a pressure of 10 kg/cm$^2$. The water flux was 790 gfd.

The wet membrane was dried overnight at room temperature. The dry membrane was placed in a vacuum vessel shown in FIG. 1 and a pressure of 0.2 Torr of ethylene oxide gas and nitrogen gas (ratio of gas pressures, 1 : 1) was applied in the vessel by controlling cocks 1 and 7. Thereafter, an alternating current voltage of 3.0 kV was applied between electrodes 3 and 4 by means of a neon transformer 2 and the membrane was exposed to the plasma for 10 minutes.

The resulting membrane was tested for permeability under the same conditions as in Example 1 (membrane area 13 cm$^2$, solute concentration 0.55%, solution temperature 25° C, feed rate 270 ml/min).

Test results:
Water flux; 12 gfd
Salt rejection; 97.1%

EXAMPLE 4 the plasma-exposed semipermeable membrane in Example 2 was tested for permeability to an aqueous solution containing phenol, benzyl alcohol, ethanol, benzoic acid, acetic acid, aniline, pyridine, dimethyl formamide or dioxane (concentration of every solution 1,000 ppm), using the same apparatus as in Example 1. the conditions and results of the experiments were as follows:

Experimental conditions:
Pressure; 50 kg/cm$^2$
Solution temperature; 25° C
Feed rate; 270 ml/min
Experimental results:

| Solute | Water flux (gfd) | Rejection (%) |
|---|---|---|
| Phenol | 9.0 | 93 |
| Benzyl alcohol | 8.5 | 85 |
| Ethanol | 9.2 | 79 |
| Benzoic acid | 9.4 | 93 |
| Acetic acid | 9.0 | 85 |
| Aniline | 9.1 | 96 |
| Pyridine | 9.0 | 76 |
| Dimethylformamide | 9.8 | 85 |
| Dioxane | 9.5 | 91 |

What is claimed is:

1. A method for the preparation of semipermeable membranes which comprises exposing porous shaped articles of polyacrylonitrile or copolymers containing acrylonitrile in an amount of more than 40% by mole to a plasma consisting essentially of a gaseous organic compound or mixture of said gaseous organic compound and an inert gas at room temperature under a pressure of 0.01 to 10 Torr, wherein said porous shaped articles of said polymeric material are prepared by a method comprising the steps of;
    (a) dissolving the polymeric material in a solvent,
    (b) casting the resulting solution,
    (c) dipping the cast solution in a non-solvent to prepare a porous membrane after partial evaporation of the solvent of the solution or without evaporation thereof, and
    (d) drying the wet porous membrane thus obtained.

2. A method according to claim 1, wherein said copolymers containing acrylonitrile of more than 40% by mole are those comprising acrylonitrile and one or more components selected from the group consisting of acrylamide, diacetone acrylamide, N-vinyl-2-pyrrolidone, hydroxyethyl methacrylate, methyl acrylate, ethyl acrylate, butyl acrylate, methyl methacrylate, ethyl methacrylate, vinyl acetate, acrylic acid, ethylene sulfonic acid, methacrylic acid, methallyl sulfonic acid, sulfopropyl methacrylate, vinylbenzene sulfonic acid, metal salts thereof, tertiary amines (e.g. 2-vinylpyridine, 4-vinylpyridine, dimethylaminoethyl methacrylate) and quaternary amine salts resulting from alkylation of the tertiary amines.

3. A method according to claim 1, wherein said copolymers contain acrylonitrile of 70 to 95% by mole.

4. A method according to claim 1, wherein the gaseous organic compound is a member selected from the group consisting of unsaturated organic compounds having a multiple bond between carbon atoms and saturated organic compounds having a hetero atom.

5. A method according to claim 4, wherein the unsaturated organic compound is a member selected from the group consisting of polymerizable compounds having no substituent and polymerizable compounds having substituent and aromatic compounds.

6. A method according to claim 4, wherein the hetero atom is nitrogen or oxygen.

7. A method according to claim 5, wherein the polymerizable compound having no substituent is ethylene, acetylene or allene.

8. A method according to claim 5, wherein the polymerizable compound having substituent is acrylonitrile, acrylic acid, 4-(or 2-)vinylpyridine, allylamine, vinyl acetate, allyl alcohol, glycidyl methacrylate, sulfopropyl methacrylate, vinyl alkyl ethers or acrylamides.

9. A method according to claim 6, wherein the saturated organic compounds having nitrogen and/or oxygen is ethylene oxide, dioxane, N-methylpyrrolidone or ethylene imine.

10. A method according to claim 1, wherein the inert gas is helium, argon, nitrogen, carbon monoxide, carbon dioxide, ammonia or water.

11. A method according to claim 1, wherein the plasma is generated by glow discharge or corona discharge.

12. A method according to claim 11, wherein said glow discharge is generated by applying an alternating current or direct current voltage of 0.5 to 50 kV under a pressure of 0.01 to 10 Torr.

13. A method according to claim 1, wherein the duration of exposure to plasma is 1 to 60 minutes and the exposure dose is 5 to 500 watt.

14. A method according to claim 1, wherein said porous shaped articles have a form of film, sheet or hollow fiber, or are a composite with other porous supports.

15. A heterogeneous membrane obtained by the method of claim 1, which has a modified dense layer in the vicinity alone of the surface thereof and pores increasing in size gradually towards the back surface of the membrane.

16. A heterogeneous membrane according to claim 15, wherein said modified dense layer has a thickness of less than 1 $\mu$.

17. A heterogeneous membrane according to claim 15, which has a thickness of 20 to 500 $\mu$ and pores of 100 to 1,000 A in size in the layer close to said modified dense layer, the size of the pores increasing gradually to 1 to 100 $\mu$ towards the back surface of the membrane.

18. A heterogeneous membrane according to claim 15, which is applicable to separation and concentration of substances by reverse osmosis or ultrafiltration.

* * * * *